(12) United States Patent
Finley

(10) Patent No.: US 7,579,978 B1
(45) Date of Patent: Aug. 25, 2009

(54) RADAR BASED RUNWAY CONFIRMATION DATABASE ACQUISITION SYSTEM

(75) Inventor: Jeffery A. Finley, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 190 days.

(21) Appl. No.: 11/496,386

(22) Filed: Jul. 31, 2006

(51) Int. Cl.
*G01S 13/89* (2006.01)
*G01S 13/88* (2006.01)

(52) U.S. Cl. .............................. 342/33; 342/63; 342/64; 342/65

(58) Field of Classification Search ............. 342/33–35, 342/63–65, 90, 189
See application file for complete search history.

(56) References Cited

U.S. PATENT DOCUMENTS 3,896,432 A * 7/1975 Young ........................... 342/33
6,061,068 A * 5/2000 Hoffman et al. ............. 345/619
6,311,108 B1 * 10/2001 Ammar et al. ................ 701/16
6,462,768 B1 * 10/2002 Oakley ......................... 348/31

OTHER PUBLICATIONS

IEEE Standard Letter Designations for Radar-Frequency Bands IEEE Std 521-1984 Sponsored by the Radar Systems Panel of the IEEE Aerospace and Electronic Systems Society Approved Mar. 22, 1984.*

* cited by examiner

*Primary Examiner*—Thomas H Tarcza
*Assistant Examiner*—Cassi Galt

(57) ABSTRACT

A method of identifying a runway is disclosed. A first scan of an area of ground known to include a runway is performed. The first scan is accomplished using a weather radar system at a predetermined position. A first image is obtained from the first scan. The first image is stored in a memory. A second scan of an area of ground proposed to include the runway is performed. The second scan is accomplished using a weather radar system at what is believed to be the predetermined position. A second image is obtained from the second scan. The first image is retrieved from the memory. It is determined whether features in the first image correlate to features in the second image. A runway confirmation signal is sent to a pilot of the aircraft when there is a substantial certainty of correlation between the first and second images.

8 Claims, 3 Drawing Sheets

RADAR BASED RUNWAY CONFIRMATION DATABASE ACQUISITION SYSTEM

FIELD OF THE INVENTION

The invention relates to avionics, and more particularly, to the use of radar for runway confirmation.

BACKGROUND OF THE INVENTION

Expectations for runway incursion prevention and runway confirmation systems are becoming increasingly common for commercial aircraft. One method of providing runway incursion/prevention is to use an enhanced vision system (EVS) to assist a pilot in identifying runways or obstacles. EVS systems employ a sensor, such as a visible-light camera or an infrared sensor, to provide additional information in low-visibility runway approaches.

Recent efforts have revealed a desire by users of enhanced vision systems to have an alternate means to descend below alert height (i.e., 100 feet) when the camera or infrared sensor typically used in such a system is incapable of allowing the pilot to confirm the presence of the runway beneath the aircraft. In certain low-visibility situations, infrared sensors cannot provide assurances adequate to descend below alert height. One proposed alternate means is to use weather radar returns of the runway. Because weather radar is already installed on the aircraft, no additional sensor system would have to be installed on the aircraft. The X band of the electromagnetic spectrum is used by certain weather radar systems and may provide satisfactory radar returns in situations in which an EVS infrared sensor is ineffective.

For weather radar to be an effective alternative to EVS for runway incursion prevention and runway confirmation functions, the radar must identify the runway with high integrity and high availability, even when ground clutter is present. In urban environments, it may be difficult to distinguish the runway from freeways. In rural environments, depending on the condition of the runway and the surrounding terrain, radar return contrast between the runway and the surrounding terrain may be low. Designing a radar-based runway detection system which is capable of operating across all these environments may be difficult and expensive.

One way of improving the detection capability of the radar without adding excessive radar design complexity is to add more correlation points between the radar return and the expected runway. In known systems the stored data, to which the radar return is correlated, consists of runway ends and perhaps location of landing lights at the runway ends. Attempts have been made to correlate sensed radar data with stored visible light images, such as publicly available satellite images or aerial photographs of runways, to increase integrity of the radar runway confirmation. However, visible light images do not necessarily correlate well with weather radar returns, which are typically in the X band. What is needed is a runway recognition system that would provide a highly predictable correlation between a radar return of a runway and a stored image representing the runway.

It is therefore an object of the invention to provide a method of recognizing a particular runway in low visibility conditions.

It is another object of the invention to provide a runway recognition system using weather radar returns of a runway.

It is another object of the invention to provide a runway recognition that minimizes the additional hardware to be placed on an aircraft.

A feature of the invention is comparing weather radar returns of a runway with a previously obtained runway image having a similar spectrum range as the weather radar return.

Another feature of the invention is to provide a unique method of collecting X-band information, i.e., via radar itself on landing.

An advantage of the invention is that no additional hardware is required to be installed when a weather radar system is present on an aircraft.

Another advantage is that the weather radar uses a portion of the electromagnetic spectrum particularly useful in some types adverse weather, and particularly in types of weather that are problematic for other known sensor systems.

SUMMARY OF THE INVENTION

The invention provides a method of identifying a runway. According to the method, a first scan of an area of ground known to include a runway is performed. The first scan is accomplished using a weather radar system at a predetermined position. A first image is obtained from the first scan. The first image is stored in a memory. A second scan of an area of ground proposed to include the runway is performed. The second scan is accomplished using a weather radar system at what is believed to be the predetermined position. A second image is obtained from the second scan. The first image is retrieved from the memory. It is determined whether features in the first image correlate to features in the second image. A runway confirmation signal is sent to a pilot of the aircraft when there is a substantial certainty of correlation between the features in the first image and the features in the second image.

The invention also provides a method of verifying location of a runway during a landing operation of an aircraft. According to the method, a scan of an area of ground proposed to include a runway is performed. The scan is accomplished using a weather radar system. An image based upon the scan is created. The image is compared with a stored image taken at a predetermined airborne position and known to include the runway. The stored image is representative of a radar return employing an electromagnetic spectrum that is substantially the same as the weather radar system. A confirmation signal is sent to a pilot of the aircraft when a substantially high correlation exists between the image and the stored image.

The invention further provides a runway confirmation system. The runway confirmation system includes a radar system configured to transmit and receive electromagnetic radiation in a range of approximately 8-12 gigahertz. A processor sends signals to the radar system to scan, at a predetermined location, an area proposed to include a runway. A memory retrieves an image derived from a previous scan, at the predetermined location, of an area known to include the runway. The memory sends the image to the processor. An alert mechanism alerts a pilot of the aircraft when the image derived from the previous scan corresponds to an image derived from the scan ordered by the processor.

DETAILED DESCRIPTION OF THE DRAWINGS

Figure 1:
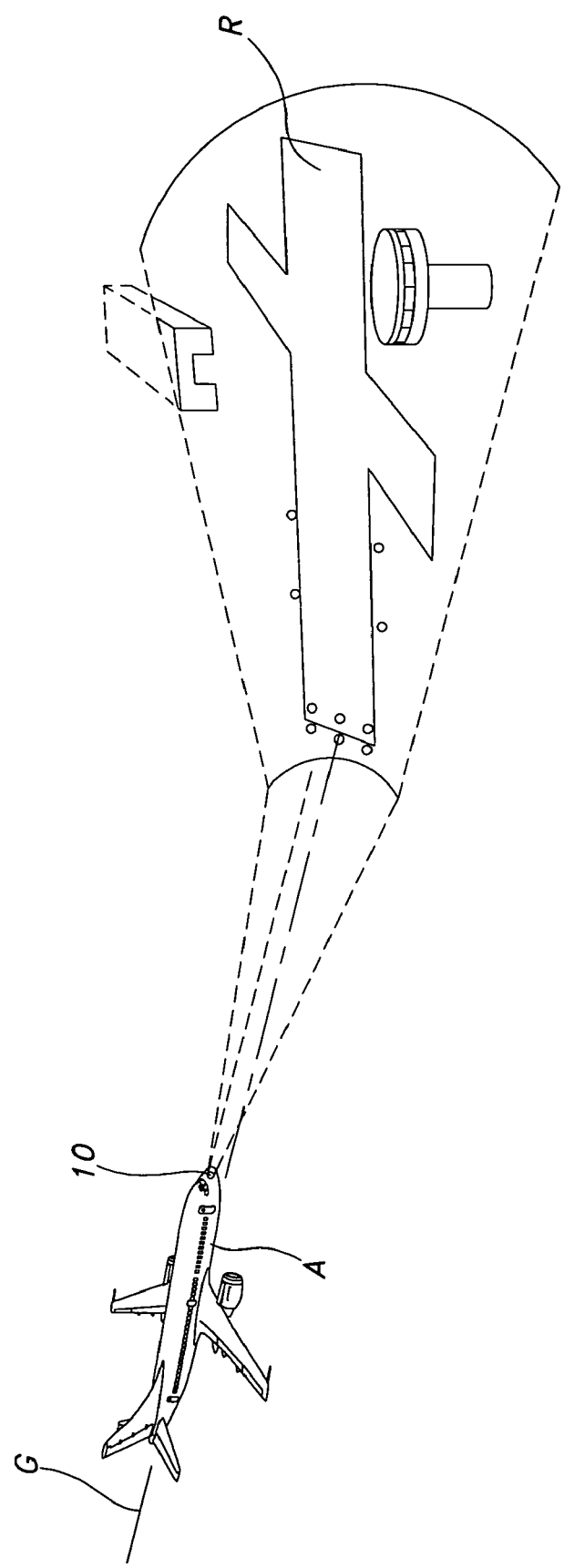
FIG. 1 is a perspective view of an aircraft approaching a runway.
Figure 2:
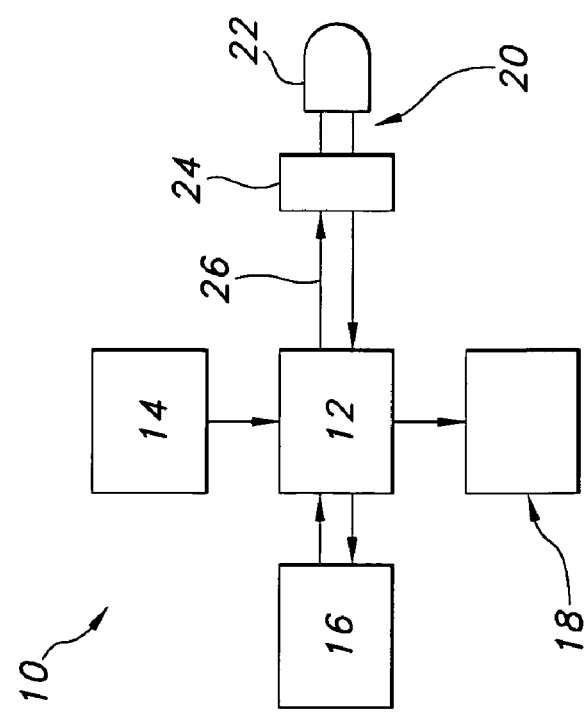
FIG. 2 is a schematic diagram of a portion of an avionics system that may be used with the invention.

Describing now the invention with reference to FIG. 1, an aircraft A is shown approaching a runway R along a path or glideslope G. Airplane A is equipped with an avionics system 10, which as shown in more detail in FIG. 2, includes a processor 12 that receives inputs from various sensors and transmits control commands to various output devices, as described herein. Specifically, an aircraft location sensor, such as a GPS receiver 14 or the like, sends to processor 12 a signal representative of a current position of the aircraft A memory 16 is also operationally connected to processor 12 and is configured to store and retrieve various data and information according to commands sent by the processor. Memory 16 preferably includes a non-volatile portion designed to store data over a long period of time, even when all or part of system 10 is powered down. Memory 16 may be integral with the processor or, as shown in FIG. 2, functionally separate therefrom. A pilot interface 18 is responsive to signals from processor 12 to provide communications to the aircraft pilot via visual, aural or tactile communication means. Processor 12 may include other inputs and outputs as desired.

A weather radar system 20 is operationally connected to processor 12. Weather radar system 20 includes a radar antenna 22 designed to transmit and receive electromagnetic signals which, in a preferred embodiment, are in the 8-12 GHz range, which is commonly known as the X-band. A radar controller 24 responds to control signals 26, sent by processor 12, to move the antenna to transmit and receive signals in a certain direction relative to the aircraft. Signals received by radar antenna 22 are sent to processor 12.

Figure 3:
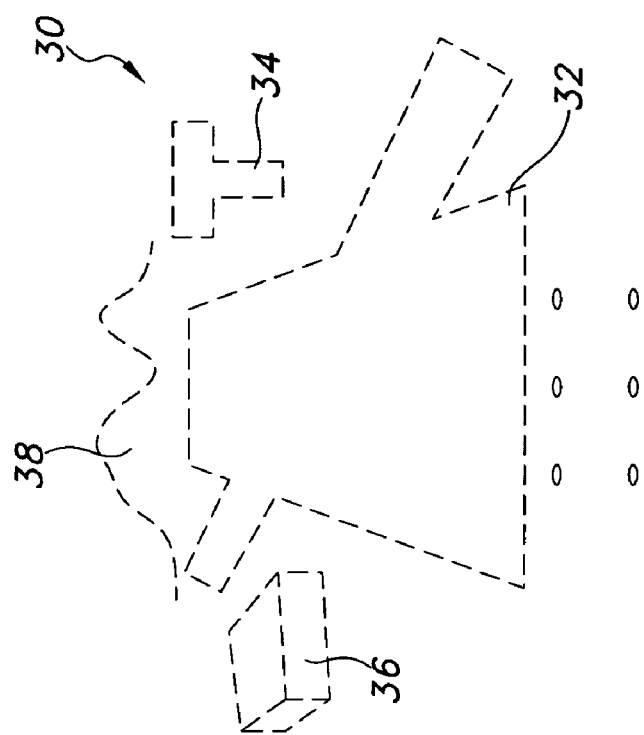
FIG. 3 is a simplified diagram of a radar return taken from the aircraft shown in FIG. 1.

The invention uses avionics system 10 to identify or recognize runway position during landing by comparing an X-band radar return with an X-band radar return taken at the same location during a previous landing operation. To obtain an initial X-band radar return, GPS receiver 14 sends a signal to processor 12 indicative of the position of aircraft A. When the aircraft is at a certain position during an approach of runway R, processor 12 sends a control signal 26 to radar controller 24 to aim radar antenna 22 below and in front of the aircraft. Radar antenna 22 then transmits pulses of horizontally or vertically oriented X-band electromagnetic radiation in the general direction specified in control signal 26. The returns from these pulses are received by radar antenna 22 and sent to processor 12, which produces a first image of the returns. A representative image is shown in FIG. 3 and indicated generally by reference number 30. Detectable in the first image are features of the runway 32, airport buildings such as a control tower 34, buildings 36 that may or may not be part of the airport, and terrain 38 that reflect X-band radiation. The processor stores the first image in memory 16, and preferably in a non-volatile portion of memory 16. Also stored in memory 16 is the precise location of the aircraft when the first image was taken. To reduce data storage requirements, the first image may be subjected to algorithms to extract registration points therefrom, such as objects or general shapes. For example, a general outline of a runway, airport and runway lighting, an airport control tower, or nearby buildings may all be stored as simplified shapes, objects or registration points. The positions of the objects/shapes or registration points in the image are also stored the memory 16.

During a subsequent landing approach or flight at the same airport, processor 12 retrieves from memory 16 the first image (or the corresponding objects/shapes and their respective positions) and the position at which the first image was obtained. Processor receives signals from GPS receiver 14 and determines when aircraft A is in the same position where the previous image was taken. It is most effective for the position to be a predetermined position along glideslope G. Processor 12 then sends a control signal 26 to radar controller 24 to aim radar antenna 22 below and in front of the aircraft as was previously done. Radar antenna 22 transmits and receives X-band electromagnetic radiation in the same manner as previously described. The X-band returns are received by radar antenna 22 and sent to processor 12, which produces a second image of the returns. The processor compares the second image with the first image using known image or object correlation algorithms. If the correlation between the features, shapes, objects and/or registration points detected and present in the first and second images is sufficiently high to conclude with substantial certainty of a match between the first and second images, it is concluded that aircraft A is landing at the correct airport and that the aircraft is properly positioned above runway R for a safe landing. Processor 12 then sends a signal to pilot interface 18 confirming the presence of runway R beneath the aircraft. On the other hand, if the correlation between the first and second images is not sufficiently high to conclude with substantial certainty of a match between the first and second images, the processor sends no such confirmatory signal to the pilot interface. In such circumstances processor 12 may even send a warning signal through the pilot interface to alert the pilot of a lack of correlation.

The invention may be enhanced by storing the second image and using the second image instead of the first image when the aircraft next attempts to land at runway R. Alternatively, images obtained during successive landing attempts may be combined, using various known combining and weighting algorithms, to provide a composite image in which may be placed a high degree of confidence in its accuracy. In the present embodiment, a third scan of the runway area may be compared against a composite image created by combining the first and second images. Furthermore, the invention may take advantage of images obtained by other aircraft making the same landing approach at runway R. Such images from other aircraft approaches may be loaded into memory 16, using a wireless data uplink or other means, for use by aircraft A during its approach of runway R. Of course, the predetermined position corresponding to the loaded images is also stored in memory as well.

It may be difficult or impossible for aircraft A to obtain an X-band radar scan in the precise location where the previous scan was taken. The invention can still be used for runway registration even when scans are taken at different positions. Scans of a runway taken at slightly different positions can be subjected to various known compensation algorithms by processor 12. Because the precise position at which each scan was taken is known, one or both of the images can be scaled, warped, or otherwise modified to correct the variations in viewing angles and ranges.

Figure 4:
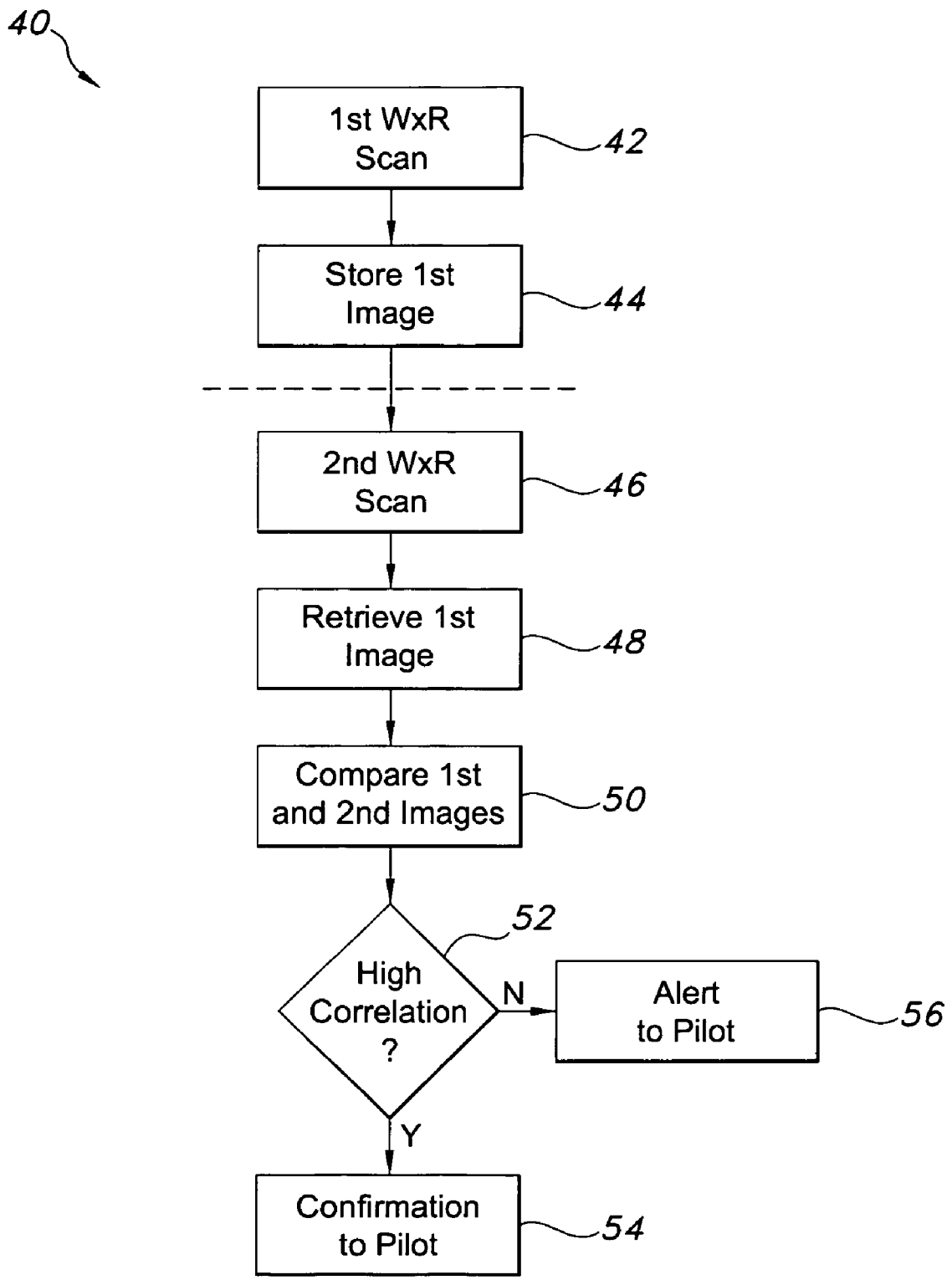
FIG. 4 is a flowchart showing a method according to the invention.

FIG. 4 shows a flowchart 40 describing a method of the invention. At 42 a first scan of a known runway is made at a predetermined position using an airborne weather radar system, which preferably employs X-band radiation. At 44 a first image derived from the first scan is stored in memory. Additionally or alternatively, features found in the first image, and the relative positions of the features, are stored in memory. At 46 a second scan of an area proposed to include the runway is made at the predetermined position using an airborne weather radar system, which preferably employs X-band radiation. A second image is derived from the second scan. At 48 the first image is retrieved from memory. At 50 the second image is compared and correlated to the first image. If at 52 it is decided there is a sufficiently high correlation, at 54 the processor sends a confirmation signal to the pilot. If at 52 it is determined there is not a sufficiently high correlation, at 56 an alert may be sent to the pilot.

The invention has been described as obtaining images taken at a predetermined position, where the predetermined position is recorded along with the image in memory. Alternatively, the predetermined position may not be a unique position with respect to every runway, but instead may be a location generic to an approach to any runway. For example, a point along any glideslope that is 1000 feet from a runway edge may be designated as the predetermined position. Then, when the aircraft is believed to be 1000 feet from the runway edge, the weather radar system obtains an image and compares the image to previously stored images as previously disclosed.

An advantage of the invention is that high integrity runway confirmations can be made with much higher availability than when only forward-looking Infrared radiation sensors are being used.

Another advantage is that the invention uses X-band radiation to detect and register runways. Since most weather radar systems employ X-band radiation, additional radar or sensing systems do not need to be installed on an aircraft for runway recognition. Such redundant use of the weather radar system reduces weight and space requirements for an additional sensor system.

Still another advantage of the invention is that repeated landings on a runway increase confidence in the accuracy of correlation between a current image and previous images. This adaptive or learning aspect of the invention provides a great advantage on aircraft that have repetitive route structures, such as aircraft flying regularly scheduled commercial routes.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A method of identifying a runway, the method comprising:

performing a first scan of an area of ground known to include a runway, the first scan being accomplished using a weather radar system at a predetermined position;

obtaining a first image from the first scan;

storing the first image in a memory;

performing a second scan of an area of ground proposed to include the runway, the second scan being accomplished using the weather radar system at what is believed to be the predetermined position;

obtaining a second image from the second scan;

retrieving the first image from the memory;

determining whether features in the first image correlate to features in the second image;

sending a runway confirmation signal to a pilot of the aircraft when there is a substantial certainty of correlation between the features in the first image and the features in the second image;

creating a composite image of the runway based upon the first image and second image;

storing the composite image in the memory;

performing a third scan of an area of ground proposed to include the runway, the third scan being accomplished using the weather radar system at what is believed to be the predetermined position;

obtaining a third image from the third scan;

retrieving the composite image from the memory;

determining whether features in the composite image correlate to features in the third image; and sending a runway confirmation signal to a pilot of the aircraft when there is a substantial certainty of correlation between the features in the composite image and the features in the third image.

2. The method of claim 1, further comprising sending an alert to the pilot when a substantial certainty of correlation does not exist between the features in the first image and the features in the second image.

3. The method of claim 1, further comprising compensating at least one of the first image and the second image for any difference between the predetermined position and the position where the second scan was performed.

4. The method of claim 1, wherein the predetermined position is along a glideslope of an aircraft landing at the airport.

5. The method of claim 1, wherein the weather radar transmits a signal between 8 and 12 gigahertz.

6. The method of claim 1, further comprising deriving a plurality of registration points from the first image, each of the plurality of registration points representing a feature recognizable in the first image.

7. The method of claim 6, wherein the plurality of registration points are derived from airport-related features.

8. The method of claim 6, wherein the plurality of registration points are derived from non-airport related features.

* * * * *